Patented Nov. 12, 1946

2,410,862

UNITED STATES PATENT OFFICE 2,410,862

PEST CONTROL

Euclid W. Bousquet, Wilmington, Del., and Hubert G. Guy, Penn Township, Allegheny County, Pa., assignors to E. I. du Pont de Nemours & Company, Wilmington, Del., a corporation of Delaware No Drawing. Application January 16, 1942,
Serial No. 426,994

9 Claims. (Cl. 167—22)

This invention relates to pest control and is particularly directed to methods and compositions for preventing or arresting infestations of insects and other pestiferous organisms of the character of fungi, bacteria, protozoa, and molds which are economically harmful to man and which commonly infest organic matter whether plant or animal or of plant or animal origin, either in the natural, fabricated or synthetic states, which methods and compositions distinguish from the methods and compositions heretofore known, in the use of an amide of imidotetrathiodicarboxylic acid as an essential active agent of the method or composition.

In our co-pending applications Serial No. 380,616 filed February 26, 1941, and Serial No. 380,768 filed February 27, 1941, we have described improvements in the art of pest control brought about by the utilization of xanthane hydride and derivatives thereof as the active pest-control agents. The pest-control agents which constitute the basis of our present invention and which we shall now describe are related in that they too are derivatives of xanthane hydride and possess similar advantages and potentialities as the active agents of pest-control compositions and methods.

The amides of imidotetrathiodicarboxylic acid are carbon-nitrogen-sulfur compounds. They comprise two groups of compounds, namely, the trithioallophanates and the dithiobiurets. The trithioallophanates are the monoamides and the dithiobiurets are the diamides of the above acid. They may be prepared from xanthane hydride which in turn may be prepared from ammonium thiocyanate. The following chart graphically illustrates suitable methods of preparation and shows the characteristic relationship of the trithioallophanates and the dithiobiurets. Other dithiobiurets are obtained when other amines are substituted for aniline and other trithioallophanates from the potassium trithioallophanate. The phenyl dithiobiuret is also capable of forming salts as indicated.

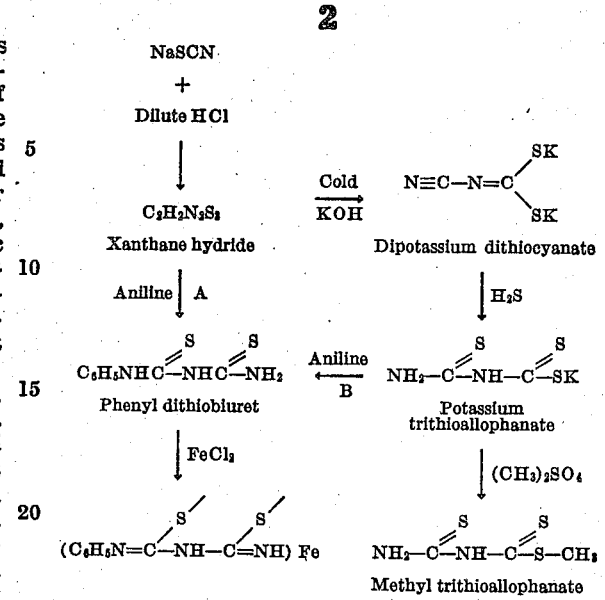

Another method adapted to the production of more highly substituted dithiobiurets involves the interaction of a thiocarbamyl isothiocyanate and a primary amine as more particularly outlined in Canadian Journal of Research, volume 2, 1930, p. 341.

By one or the other of the general methods outlined above or by any other suitable method various derivatives of imidotetra thiodicarboxylic acid may be obtained in which one or both of the sulfhydryl groups are replaced by amido groups, which may be substituted upon the amido nitrogen by such radicals as alkyl, aryl, aralkyl or cycloalkyl. The radicals attached to the amido nitrogen may be either substituted or unsubstituted as specified below. Any of these products, whether dithiobiurets or trithioallophanates, may exist as the salts of sodium, potassium, zinc, nickel, cobalt, aluminum, calcium, barium, arsenic, tin, magnesium, lead, copper, iron, manganese, etc. In the case of the dithiobiurets, as will be apparent from the foregoing chart, the salt-forming properties are dependent upon the ability of the dithiobiuret to undergo the tautomeric rearrangement illustrated. Some of the dithiobiurets within the scope of this invention consequently may be unable to form any salts.

A preferred group are the dithiobiurets, particularly dithiobiuret itself (NH₂—CSNH—CS—NH₂)

and the aryl-substituted dithiobiurets, and more particularly those compounds in which one hydrogen of dithiobiuret is replaced by an aryl group such as the naphthyl group, a phenyl group, a phenyl group substituted by one or more methyl, ethoxy, nitro or chloro groups, or a benzofuryl group. The corresponding metal salts, particularly of copper and iron, are also preferred. These preferred compounds in general are insoluble in water, ether, or acetone, and soluble to a limited extent in alcohol and hydrocarbon solvents such as benzene. They are high melting solids, odorless and practically colorless in the pure state. The dithiobiurets as a rule are also soluble in dilute aqueous alkaline solutions.

The pest control agents of this invention may be incorporated in suitable compositions according to their intended use, i. e., as insecticides or insectifuges, foliage protectants or disinfectants, protectants for textile fabrics especially woolens, in fly sprays, in poison baits or otherwise. Suitable methods of preparation and suitable methods of application are illustrated in the following examples, in which the parts are by weight:

EXAMPLE 1

*Phenyldithiobiuret*

A mixture of 112 parts of aniline and 150 parts of xanthane hydride was heated slowly with agitation until the reaction becomes exothermic (usually in the neighborhood of 80–85° C.) and the temperature was allowed to ascend to 110° C. where the reaction was maintained for 15 minutes. After cooling, the reaction mixture was washed with a mixture of dilute acid made from 25 parts of concentrated hydrochloric acid and 200 parts of water, followed by scrubbings with 100 cc. portions of water. The crude yellow powder after air-drying weighed approximately 250 parts and melts at 160–164° C. This product may be used as such or it may be further purified by recrystallization from ethanol. One such recrystallization gave fine, white crystalline leaflets melting at 169–170° C. The material is alkali-soluble (5% aqueous sodium hydroxide).

In place of aniline there may be substituted p-toluidine, alpha-naphthylamine, p-phenetidine, or 2-aminodibenzofuran in approximately the same molal ratio.

EXAMPLE 2

*Potassium trithioallophanate*

This compound is prepared by a method appearing in the literature (cf. Hantsch and Wolvekamk, Ann. 331,265 et seq. (1907); Rosenheim, Levy, and Grünbaum, Ber. 42, 2923 (1909)). A solution of 380 parts of potassium hydroxide in 460 parts of water was cooled to 20° C. and 500 parts of crude xanthane hydride was added slowly and with stirring after standing for 10 minutes, the precipitated sulfur was filtered off and the filtrate saturated with hydrogen sulfide while stirring at 20–25° C. The mixture was then allowed to stand for 4 hours during which time it was cooled to 0° C. The potassium trithioallophanate formed as yellow crystals that were filtered off and washed with cold methanol. The yield was 364 parts (58% of the theoretical) of orange-yellow crystals, soluble in water.

The potassium trithioallophanate may be reacted with an alkylating agent such as dimethyl sulfate, benzyl chloride, 2,4,6-trichlorobenzyl chloride and dodecyl bromide to form the corresponding esters (ester-amide of imidotetrathiodicarboxylic acid) or it may be reacted with aniline or other suitable amine to form the corresponding amide (diamide of imidotetrathiodicarboxylic acid). The following examples, 3 and 4, are illustrative.

EXAMPLE 3

*Methyl trithioallophanate*

This ester is prepared as follows:

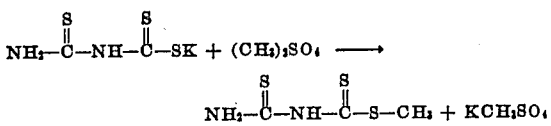

To a solution of 38 parts of potassium trithioallophanate in 150 parts of water at 20–30° C. there was added slowly and with good stirring 26 parts of dimethyl sulfate. The reaction mixture was finally made slightly alkaline with dilute potassium hydroxide. The crystals are filtered off and recrystallized from methanol. The yield was 26 parts of light yellow crystals (78% of the theoretical) melting at 167–8° C. and containing by analysis 57.44% sulfur (calculated value is 57.80%).

In place of dimethyl sulfate there may be substituted benzyl chloride, 2,4,6-trichlorobenzyl chloride or dodecyl bromide, methyl bromide, butyl bromide, 2-ethyl-hexyl iodide, and the like.

EXAMPLE 4

*2,4-dimethylphenyldithiobiuret*

A mixture of 36 g. of meta-4-xylidine (1-amino-2,4-dimethylbenzene), 38 g. of potassium trithioallophanate, and 75 cc. of glacial acetic acid was heated at 75–90° C. with agitation until the evolution of hydrogen sulfide gas practically ceased. The cooled reaction mixture was washed with water and dilute hydrochloric acid until all the excess xylidine was washed out. The air-dried product weighed 38 grams. Recrystallization from benzene gave a product melting at 138–139° C. consisting of light, cream-colored crystals, which on analysis for nitrogen showed 17.13% content of this element (theory, 17.58%).

In place of meta-4-xylidine there may be substituted aniline, p-chloraniline, beta-naphthylamine or benzidine.

EXAMPLE 5

*Cupric phenyldithiobiuret*

Disodium phenyldithiobiuret was prepared by adding 31.5 parts of phenyldithiobiuret to an alkaline solution made by dissolving 12 parts of sodium hydroxide in 25 parts water and 100 parts of ethanol. To this clear solution was added a water-alcohol solution of 25.6 parts of copper chloride (CuCl₂·2H₂O) in a 50% solution of aqueous ethanol. The dark precipitate which resulted on mixture of these two solutions was filtered and washed thoroughly with water. On air-dry a light gray-green precipitate was obtained which showed a copper content of 23.37 per cent.

EXAMPLE 6

Ferrous phenyldithiobiuret

This salt was prepared in a manner similar to Example 5 but using ferrous chloride instead of cupric chloride. It was obtained in quantitative yield as a light-brown salt which on analysis showed a content of 21.08% iron as compared to 21.07% for the theoretical value.

EXAMPLE 7

Dithiobiuret

Three hundred sixty grams of dicyandiamide and 4500 cc. of water were heated together in a sealed autoclave to 78° C. Then hydrogen sulfide was fed in at 200 lbs./sq. in. pressure at 70–80° C. until pressure drops were no longer noted. The time required was approximately 5 hours. The charge was agitated at the same temperature for three hours longer under hydrogen sulfide pressure, then cooled to room temperature and filtered. The yield of crude product after drying on the steam bath amounted to 308 grams, and melted at 173–175° C. with decomposition.

Purification of the crude product was accomplished by dissolving in sodium hydroxide solution and treating with bone black; after which the alkaline filtrate from the bone blacked mass was slowly acidified with concentrated hydrochloric acid. The resulting precipitate was filtered, washed free of acid and dried on a steam bath yielding approximately a 40% yield of straw-colored crystals melting at 171–172° C. Analysis for nitrogen and sulfur compared closely to calculated values for dithiobiuret.

The following examples are illustrative of compositions suitable for pest control applications:

EXAMPLE 8

An 0.5% dust was made by mixing an acetone solution of dithiobiuret with talc and drying. When applied to bean foliage infested with Mexican bean beetle larvae, this composition gave 100% kill of the larvae and allowed only 3% feeding. Under the same conditions calcium arsenate effected only 80% control. No injury resulted from the application of dithiobiuret to the bean foliage.

EXAMPLE 9

A water-dispersible powder prepared by milling together 80 parts of p-tolyldithiobiuret, 19 parts of Bancroft clay, and 1% of the mixed higher alcohols obtained by hydrogenation of coconut oil applied to bean foliage from a 1 to 200 aqueous dispersion gave complete protection of the foliage from Mexican bean beetle without injury to the bean foliage.

4-xylyldithiobiuret similarly compounded and applied afforded similar protection to the foliage without injury.

EXAMPLE 10

A water-dispersible powder was prepared by milling 80 parts of phenyldithiobiuret with 18.8 parts of Bancroft clay, 0.7 part of sulfonated condensation product of naphthalene and formaldehyde and 0.5 part of the mixed higher alcohols obtained from hydrogenation of coconut oil. Applied as an aqueous spray at a concentration of 1 to 400 to smartweed foliage infested with Japanese beetles as described in U. S. Patent 2,205,232, the spray was approximately equal to lead arsenate in protecting against foliage damage (8% foliage eaten as compared to 5% for lead arsenate). No injury could be observed to the host plant.

EXAMPLE 11

A milled composition of the iron salt of phenyldithiobiuret containing 80% active ingredient and prepared in a manner similar to the above phenyldithiobiuret composition likewise gave satisfactory control of Japanese beetles without injury to the smartweed foliage. The results of this experiment were also comparable to the lead arsenate spray used as a control.

EXAMPLE 12

An aqueous spray of the 4-xylyldithiobiuret made up as outlined under Example 9 and applied to smartweed foliage infested with Japanese beetles was practically as effective as the control lead arsenate spray in repelling this insect from its destructive activities on the foliage.

The following examples illustrate the application of the products of the invention to the protection of woolen fabrics and the like from attack by moths:

EXAMPLE 13

Woolen fabric was impregnated with an acetone solution containing 2% of dithiobiuret and dried. When the treated fabric was exposed to moth larvae for two weeks under conditions in which untreated woolen fabric suffered 55% damage it showed only 2% damage and 100% of the moth larvae were killed.

EXAMPLES 14 AND 15

Woolen fabrics impregnated from 2% acetone solutions of phenyldithiobiuret and p-tolyldithiobiuret and similarly exposed, as outlined in Example 13, to moth larvae suffered only minor damage (2–5%) whereas untreated test fabrics were severely damaged.

EXAMPLE 16

Woolen fabrics impregnated from 1% acetone solution of methyl trithioallophanate and similarly exposed as outlined in Example 13 to moth larvae suffered only minor damage (4%) whereas untreated test fabrics were severely damaged.

EXAMPLE 17

Methyl trithioallophanate in nutrient agar resisted atack of mixed lumber molds and Aspergillus niger and prevented all growth of these organisms at concentrations of 1–1000.

The pest-control agents of this invention may be used as fungicides, insecticides, insectifuges, foliage protectants, mothproofing agents, aphicides, and as the toxic ingredients in baits. They are particularly useful for protecting textile materials from the ravages of clothes moths and carpet beetles, and for protecting growing plants and foliage from depredatory insects such as the Mexican bean beetle, the Colorado potato beetle, the Japanese beetle, and the like. Some of the agents of this invention may also be used to prevent bacteria and fungous decay and putrefaction of such materials as rawhides, glues, gelatins, carbohydrate pastes, rope, lumber, fabrics, and other materials, either natural or manufactured, that are subject to attack and decomposition by microorganisms. These products may also be used for the control of mildew and other fungous diseases to which living plants are subject. The agents of this invention are thus useful for the control of agricultural parasites, household parasites, industrial parasites and livestock parasites, and are thus useful for the control of pests within the meaning of that term as employed in the specification of U. S. Patent 2,165,030 granted July 4, 1939.

They may be used in various combinations with such auxiliary materials as spreaders, stickers, and other toxicants; for example, insecticides such as metallic arsenates, fluosilicates, phenothiazines, thiuram disulfides, organic thiocyanates, such as n-dodecyl thiocyanate and butyl Carbitol thiocyanate, nicotine, anabasine (neo-nicotine), nor-nicotine, rotenone and its congeners, hellebore, pyrethrum, N-isobutylundecylenamide, aminomethyl sulfides, and bactericides and fungicides such as sulfur, polysulfides such as lime-sulfur, the chlorinated phenols, aminomethyl sulfides, copper acylacetonates, copper chelates of beta-keto acids and esters, copper chelates of salicylaldehyde, Burgundy mixture, Bordeaux mixture, the so-called insoluble coppers such as basic copper sulfates, copper oxychlorides, copper calcium chlorides, copper oxides, copper silicates, copper zeolites, and copper thiocyanates, the long chain quaternary ammonium halides and derivatives of dithiocarbamic acid such as ferric dimethyldithiocarbamate. They may be used in the form of aqueous sprays, dusts or solutions, dispersed with wetting agents such as the alkali metal or amine salts of oleic acid and the sulfated higher alcohols, the sulfonated animal and vegetable oils such as sulfonated fish or castor oils or the sulfonated petroleum oils; with diluents such as calcium phosphate, Bancroft clay, kaolin, diatomaceous earth, sulfur, lime, pyrophyllite talc, bentonite, flours such as walnut shell, wheat, redwood, soya bean, cottonseed, or with organic solvents such as trichloroethylene, tetrachloroethylene, Stoddard solvent, and other hydrocarbon solvents. They may be used in vegetable and mineral oil sprays in which petroleum or vegetable oil glycerides are used as contact agents or active poisons. Various adhesive and sticking materials such as rosin and glue and various other common adjuvants such as lime may be used. Such mixtures as are here set out may have particular usefulness in special applications and frequently will give better results than would be anticipated from the killing power or repellent action of each ingredient when used alone.

Thus the active agents of this invention may be formulated in a wide variety of ways as may be best suited to the control of any particular pest or combination of pests having in mind the nature of the pests, their particular habitat and feeding habits and their peculiar susceptibilities, if any. Thus suitable compositions may be prepared with the active agent in a state of composition, subdivision, association with such other materials as have been mentioned, etc., such as may be necessary peculiarly to adapt the active agent to the purpose to be effected.

We claim:

1. An insecticidal and insectifugal composition containing as an essential active ingredient an aryldithiobiuret and a carrier therefor.

2. A process for protecting material from attack by pestiferous organisms which comprises treating the material with an amide of imidotetrathiodicarboxylic acid and a carrier therefor.

3. A process for protecting material from attack by pestiferous organisms which comprises treating the material with a dithiobiuret.

4. A process for protecting material from attack by pestiferous organisms which comprises treating the material with an aryldithiobiuret.

5. A process for protecting material from attack by pestiferous organisms which comprises treating the material with dithiobiuret.

6. A pest control composition containing as an essential active ingredient methyl trithioallophanate and a carrier therefor.

7. A process for protecting material from attack by pestiferous organisms which comprises treating the material with methyl trithioallophanate.

8. A pest control composition containing as an essential active ingredient the iron salt of phenyl dithiobiuret and a carrier therefor.

9. A process for protecting material from attack by pestiferous organisms which comprises treating the material with the iron salt of phenyl dithiobiuret.

EUCLID W. BOUSQUET
HUBERT G. GUY.